(12) United States Patent
Markoski et al.

(10) Patent No.: US 8,783,304 B2
(45) Date of Patent: Jul. 22, 2014

(54) LIQUID CONTAINERS AND APPARATUS FOR USE WITH POWER PRODUCING DEVICES

(75) Inventors: Larry J. Markoski, Raleigh, NC (US); Timothy C. Simmons, Durham, NC (US)

(73) Assignee: INI Power Systems, Inc., Morrisville, NC (US)

( * ) Notice: Subject to any disclaimer, the term of this patent is extended or adjusted under 35 U.S.C. 154(b) by 0 days.

(21) Appl. No.: 13/298,084

(22) Filed: Nov. 16, 2011

(65) Prior Publication Data

US 2013/0017467 A1 Jan. 17, 2013

Related U.S. Application Data

(60) Provisional application No. 61/419,743, filed on Dec. 3, 2010.

(51) Int. Cl.
*H01M 2/36* (2006.01)

(52) U.S. Cl.
USPC .................. 141/18; 141/330; 222/86

(58) Field of Classification Search
USPC ............ 141/18, 329–330; 222/85–86
See application file for complete search history.

(56) References Cited

U.S. PATENT DOCUMENTS

| | | |
|---|---|---|
| 3,357,861 A | 12/1967 | Hunger |
| 3,731,846 A * | 5/1973 | Turner et al. .......... 222/86 |
| 3,992,223 A | 11/1976 | Gutbier |
| 4,614,575 A | 9/1986 | Juda et al. |
| 4,722,773 A | 2/1988 | Plowman et al. |
| 4,732,822 A | 3/1988 | Wright et al. |
| 4,783,381 A | 11/1988 | Tytgat et al. |
| 5,290,414 A | 3/1994 | Marple |
| 5,316,629 A | 5/1994 | Clifford et al. |
| 5,599,638 A | 2/1997 | Surampudi et al. |
| 5,846,670 A | 12/1998 | Watanabe |
| 5,960,508 A | 10/1999 | Holt et al. |
| 6,003,191 A | 12/1999 | Sherry et al. |
| 6,007,931 A | 12/1999 | Fuller et al. |
| 6,013,385 A | 1/2000 | DuBose |
| 6,024,848 A | 2/2000 | Dufner et al. |
| 6,039,853 A | 3/2000 | Gestermann et al. |

(Continued)

FOREIGN PATENT DOCUMENTS

| | | |
|---|---|---|
| CA | 2 473 329 | 10/2009 |
| EP | 0 252 559 | 6/1991 |

(Continued)

OTHER PUBLICATIONS

Chen et al., "Ion exchange resin/polystyrene sulfonate composite membranes for PEM fuel cells", Journal of Membrane Science, 243, pp. 327-333, 2004.

(Continued)

*Primary Examiner* — Gregory Huson
*Assistant Examiner* — Nicolas A Arnett
(74) *Attorney, Agent, or Firm* — Evan Law Group LLC

(57) ABSTRACT

A fuel reservoir for dispensing liquid fuel with a dispensing appliance includes a container having an opening, a liquid fuel in the container, a needle-pierceable septum disposed across the opening of the container, and a locking surface disposed on an exterior surface of the container and configured to engage a locking mechanism of a dispensing appliance.

14 Claims, 9 Drawing Sheets

UNLOADED STATE/NOT ENGAGED

(56) References Cited

U.S. PATENT DOCUMENTS

| | | | |
|---|---|---|---|
| 6,048,123 A | 4/2000 | Holt et al. | |
| 6,101,661 A | 8/2000 | Policicchio et al. | |
| 6,103,413 A | 8/2000 | Hinton et al. | |
| 6,110,613 A | 8/2000 | Fuller | |
| 6,136,272 A | 10/2000 | Weigl et al. | |
| 6,209,738 B1* | 4/2001 | Jansen et al. | 215/247 |
| 6,255,012 B1 | 7/2001 | Wilson et al. | |
| 6,386,392 B1 | 5/2002 | Argentieri et al. | |
| 6,444,343 B1 | 9/2002 | Prakash et al. | |
| 6,447,943 B1 | 9/2002 | Peled et al. | |
| 6,460,733 B2* | 10/2002 | Acker et al. | 222/94 |
| 6,472,090 B1 | 10/2002 | Colbow et al. | |
| 6,485,851 B1 | 11/2002 | Narayanan et al. | |
| 6,492,047 B1 | 12/2002 | Peled et al. | |
| 6,528,200 B1 | 3/2003 | Yoshitake et al. | |
| 6,638,654 B2 | 10/2003 | Jankowksi et al. | |
| 6,641,948 B1 | 11/2003 | Ohlsen et al. | |
| D485,178 S | 1/2004 | Pouillot et al. | |
| 6,713,206 B2 | 3/2004 | Markoski et al. | |
| 6,715,899 B1 | 4/2004 | Wu | |
| 6,716,548 B1 | 4/2004 | Kaliaguine et al. | |
| 6,720,105 B2 | 4/2004 | Ohlsen et al. | |
| 6,727,016 B2 | 4/2004 | Bostaph et al. | |
| 6,808,840 B2 | 10/2004 | Mallari et al. | |
| 6,811,916 B2 | 11/2004 | Mallari et al. | |
| 6,852,443 B1 | 2/2005 | Ohlsen | |
| 6,871,844 B2 | 3/2005 | Yan et al. | |
| 6,875,535 B2* | 4/2005 | Ye et al. | 429/437 |
| 6,890,680 B2 | 5/2005 | Beckmann et al. | |
| 6,893,763 B2 | 5/2005 | Fan et al. | |
| 6,911,411 B2 | 6/2005 | Cox et al. | |
| 6,924,058 B2 | 8/2005 | Ohlsen et al. | |
| 6,960,285 B2 | 11/2005 | Schoeniger et al. | |
| 6,994,932 B2* | 2/2006 | Kinkelaar et al. | 429/447 |
| 7,014,944 B2 | 3/2006 | Kordesch et al. | |
| 7,067,216 B2 | 6/2006 | Yan et al. | |
| 7,080,672 B2* | 7/2006 | Fournie et al. | 141/383 |
| 7,087,333 B2 | 8/2006 | Schäfer | |
| 7,090,793 B2 | 8/2006 | Ma et al. | |
| 7,205,064 B2 | 4/2007 | Markoski et al. | |
| 7,291,410 B2* | 11/2007 | Kinkelaar et al. | 429/513 |
| 7,416,808 B2* | 8/2008 | Fujita et al. | 429/425 |
| 7,645,536 B2* | 1/2010 | Akiyama et al. | 429/428 |
| 7,651,797 B2 | 1/2010 | Markoski et al. | |
| 7,651,804 B2* | 1/2010 | Kajitani et al. | 429/439 |
| 7,670,706 B2* | 3/2010 | Yamamoto et al. | 429/404 |
| 7,901,817 B2 | 3/2011 | Markoski et al. | |
| 8,119,305 B2 | 2/2012 | Markoski et al. | |
| 8,158,300 B2 | 4/2012 | Markoski et al. | |
| 8,163,429 B2 | 4/2012 | Markoski et al. | |
| 8,551,667 B2 | 10/2013 | Markoski et al. | |
| 2001/0033960 A1 | 10/2001 | Cavalca et al. | |
| 2001/0041283 A1 | 11/2001 | Hitomi | |
| 2001/0053472 A1 | 12/2001 | Edlund | |
| 2002/0015868 A1 | 2/2002 | Surampudi et al. | |
| 2002/0031695 A1 | 3/2002 | Smotkin | |
| 2002/0041991 A1 | 4/2002 | Chan et al. | |
| 2002/0083640 A1 | 7/2002 | Finkelshtain et al. | |
| 2002/0091225 A1 | 7/2002 | McGrath et al. | |
| 2002/0127454 A1 | 9/2002 | Narang et al. | |
| 2003/0003348 A1 | 1/2003 | Hanket | |
| 2003/0091883 A1 | 5/2003 | Peled et al. | |
| 2003/0096151 A1 | 5/2003 | Blunk et al. | |
| 2003/0110841 A1 | 6/2003 | Zhang et al. | |
| 2003/0129464 A1* | 7/2003 | Becerra et al. | 429/25 |
| 2003/0148159 A1 | 8/2003 | Cox et al. | |
| 2003/0170524 A1 | 9/2003 | Kordesch et al. | |
| 2003/0175581 A1 | 9/2003 | Kordesch et al. | |
| 2003/0194596 A1 | 10/2003 | Ye et al. | |
| 2003/0194598 A1 | 10/2003 | Chan | |
| 2003/0198852 A1 | 10/2003 | Masel et al. | |
| 2003/0219640 A1 | 11/2003 | Nam et al. | |
| 2003/0231004 A1 | 12/2003 | Takahashi et al. | |
| 2004/0018415 A1 | 1/2004 | Lai et al. | |
| 2004/0039148 A1 | 2/2004 | Cao et al. | |
| 2004/0045816 A1 | 3/2004 | Masel et al. | |
| 2004/0058217 A1 | 3/2004 | Ohlsen et al. | |
| 2004/0062965 A1 | 4/2004 | Morse et al. | |
| 2004/0072047 A1 | 4/2004 | Markoski et al. | |
| 2004/0084789 A1 | 5/2004 | Yan et al. | |
| 2004/0096721 A1 | 5/2004 | Ohlsen et al. | |
| 2004/0101740 A1 | 5/2004 | Sanders | |
| 2004/0115518 A1 | 6/2004 | Masel et al. | |
| 2004/0121208 A1 | 6/2004 | James et al. | |
| 2004/0121209 A1 | 6/2004 | Yan et al. | |
| 2004/0126666 A1 | 7/2004 | Cao et al. | |
| 2004/0151965 A1 | 8/2004 | Forte et al. | |
| 2004/0209153 A1 | 10/2004 | Peled et al. | |
| 2004/0209154 A1 | 10/2004 | Ren et al. | |
| 2004/0265681 A1 | 12/2004 | Markoski et al. | |
| 2005/0001352 A1 | 1/2005 | Ma et al. | |
| 2005/0003263 A1 | 1/2005 | Mallari et al. | |
| 2005/0008923 A1 | 1/2005 | Malhotra | |
| 2005/0026026 A1 | 2/2005 | Yen et al. | |
| 2005/0053826 A1 | 3/2005 | Wang et al. | |
| 2005/0058880 A1* | 3/2005 | Fujita et al. | 429/38 |
| 2005/0074657 A1 | 4/2005 | Rusta-Sallehy et al. | |
| 2005/0084737 A1 | 4/2005 | Wine et al. | |
| 2005/0084738 A1 | 4/2005 | Ohlsen et al. | |
| 2005/0089748 A1 | 4/2005 | Ohlsen et al. | |
| 2005/0123812 A1 | 6/2005 | Okamoto | |
| 2005/0136309 A1 | 6/2005 | Masel et al. | |
| 2005/0161342 A1 | 7/2005 | Carson et al. | |
| 2005/0191541 A1 | 9/2005 | Gurau et al. | |
| 2005/0202305 A1 | 9/2005 | Markoski et al. | |
| 2005/0260465 A1* | 11/2005 | Harris | 429/13 |
| 2006/0003217 A1 | 1/2006 | Cohen et al. | |
| 2006/0035136 A1 | 2/2006 | Markoski et al. | |
| 2006/0040146 A1 | 2/2006 | Yamaguchi | |
| 2006/0040147 A1 | 2/2006 | Yamaguchi | |
| 2006/0059769 A1 | 3/2006 | Masel et al. | |
| 2006/0078785 A1 | 4/2006 | Masel et al. | |
| 2006/0088744 A1 | 4/2006 | Markoski et al. | |
| 2006/0141328 A1 | 6/2006 | Johnston et al. | |
| 2006/0147785 A1 | 7/2006 | Chiang et al. | |
| 2006/0222923 A1 | 10/2006 | Muramatsu et al. | |
| 2006/0228622 A1 | 10/2006 | Cohen et al. | |
| 2007/0020491 A1 | 1/2007 | Ogburn | |
| 2007/0151983 A1* | 7/2007 | Patel et al. | 222/95 |
| 2007/0166595 A1* | 7/2007 | Akiyama et al. | 429/34 |
| 2007/0190393 A1 | 8/2007 | Markoski et al. | |
| 2007/0277368 A1 | 12/2007 | Adams et al. | |
| 2007/0298312 A1 | 12/2007 | Koehler et al. | |
| 2008/0070083 A1 | 3/2008 | Markoski et al. | |
| 2008/0248343 A1 | 10/2008 | Markoski et al. | |
| 2008/0274393 A1 | 11/2008 | Markoski et al. | |
| 2009/0035644 A1 | 2/2009 | Markoski et al. | |
| 2009/0110997 A1* | 4/2009 | Yamamoto et al. | 429/34 |
| 2010/0196800 A1 | 8/2010 | Markoski et al. | |
| 2011/0003226 A1 | 1/2011 | Markoski et al. | |
| 2011/0008713 A1 | 1/2011 | Markoski et al. | |
| 2012/0301799 A1 | 11/2012 | Markoski et al. | |
| 2013/0017467 A1 | 1/2013 | Markoski et al. | |

FOREIGN PATENT DOCUMENTS

| | | |
|---|---|---|
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 63 313472 A | 12/1988 |
| KR | 10-2008-0045416 | 5/2008 |
| WO | WO 94/09524 | 4/1994 |
| WO | WO 96/12317 | 4/1996 |
| WO | WO 98/06145 | 2/1998 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 2004/027891 A2 | 4/2004 |
| WO | WO 2004/027901 A2 | 4/2004 |

(56) References Cited

FOREIGN PATENT DOCUMENTS

| WO | WO 2005/082024 | 9/2005 |
|---|---|---|
| WO | WO2005/082024 A2 | 9/2005 |
| WO | WO 2005/088759 A2 | 9/2005 |
| WO | WO 2007013880 | 2/2007 |
| WO | WO 2007/095492 | 8/2007 |
| WO | WO 2008/122042 | 10/2008 |

OTHER PUBLICATIONS

Granados-Focil et al., "Polyphenylene Sulfonic Acid: a new PEM", http://www1.eere.energy.gov/hydropenandfuelcells/pdfs/hi_tem_gems_talk.pdf, 26 pages, 2003.

Jiang et al., "$CO_2$ Crossover Through a Nafion Membrane in a Direct Methanol Fuel Cell", Electrochemical and Solid-State Letters, 5 (7), pp. A156-A159, 2002.

Service, "New Polymer May Rev Up the Output of Fuel Cells Used to Power Cars", Science, vol. 312, p. 35, 2006.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Hejze et al., "Preparation of Pd-coated polymer electrolyte membranes and their application in direct methanol fuel cells", Journal of Power Sources, 140, pp. 21-27, 2005.

Kordesch et al., "Direct methanol-air fuel cells with membranes plus circulating electrolyte", Journal of Power Sources, 96, pp. 200-203, 2001.

Li et al., "An improved palladium-based DMFCs cathode catalyst", Chem. Commun., pp. 2776-2777, 2004.

Peled et al., "0.5 $W/cm^2$ Direct Methanol-Air Fuel Cell", Electrochemical and Solid-State Letters, 7 (12), pp. A507-A510, 2004.

Baker, "Membrane Technology," Encyclopedia of Polymer Science and Technology, vol. 3, pp. 184-249, 2001.

Kim et al., "Non-Nafion Membrane Electrode Assemblies", Los Alamos National Laboratory, http://www.hydrogen.energy.gov/pdfs/review06/fc_3_kim.pdf, pp. 1-24, 2005.

Shim et al., Nafion-impregnated polyethylene-terephthalate film used as the electrolyte for direct methanol fuel cells, Electrochimica Acta, 50, pp. 2385-2391, 2005.

"Celtec® V-Membrane for DMFC Applications", PEMAS Fuel Cell Technologies, 6 pages, printed Jul. 19, 2005.

Rozière et al., "Non-Fluorinated Polymer Materials for Proton Exchange Membrane Fuel Cells", Annu. Rev. Mater. Res., 33, pp. 503-555, 2003.

Shim et al., "Electrochemical Acceleration of Hydrogen Transfer Through a Methanol Impermeable Metallic Barrier", Journal of the Electrochemical Society, 150 (12), pp. A1583-A1588, 2003.

Tang et al., "Modification of Nafion™ membrane to reduce methanol crossover via self-assembled Pd nanoparticles", Materials Letters, 59, pp. 3766-3770, 2005.

Peled et al., "A Direct Methanol Fuel Cell Based on a Novel Low-Cost Nanoporous Proton-Conducting Membrane", Electrochemical and Solid-State Letters, 3 (12), pp. 525-528, 2000.

Peled et al., "Novel approach to Recycling Water and Reducing Water Loss in DMFCs", Electrochemical and Solid-State Letters, 6 (12), pp. A268-A271, 2003.

Blum et al., "Water-neutral micro direct-methanol fuel cell (DMFC) for portable applications", Journal of Power Sources, 117, pp. 22-25, 2003.

Zhu et al., "The behavior of palladium catalysts in direct formic acid fuel cells", Journal of Power Sources, 139, pp. 15-20, 2005.

Sigracet, GDL 24 & 25 Series Gas Diffusion Layer, product information, SGL Carbon Group, 2 pages, 2004.

Choi et al., "Modification of proton conducting membrane for reducing methanol crossover in a direct-methanol fuel cell", Journal of Power Sources, 96, pp. 411-414, 2001.

Pu et al., "A Methanol Impermeable Proton Conducting Composite Electrolyte System", Journal of the Electrochemical Society, 142, pp. L119-L120, 1995.

Kim et al., "Evaluation of a palladinized Nafion™ for direct methanol fuel cell application", Electrochimica Acta, 49, pp. 3227-3234, 2004.

Halliday. et al., "Fundamentals of Physics", Extended Third Edition, pp. 662-685, 1988.

Osmonics The Filtration Spectrum, Osmonics, Inc., Minnetonka, Minnesota, 1 page, (1984).

Xia, S.J. et al., Proceedings of the $207^{th}$ Meeting of the Electrochemical Society, Abstract #779, Quebec City, Canada, May 21-25, 2005.

Choban, E.R. et al., "Microfluidic Fuel Cells That Lack a PEM", Power Sources Proceedings, vol. 40, pp. 317-320, (2002).

Choban, E.R. et al., "Membraneless Fuel Cell Based on Laminar Flow," ASME Fuel Cell Science, Engineering and Technology Proceedings, pp. 261-265, (2003).

Ferrigno, R. et al., "Membraneless Vanadium Redox Fuel Cell Using Laminar Flow", J. Am. Chem. Soc., vol. 124, pp. 12930-12931, (2002).

Choban, E.R. et al., "Characterization of Limiting Factors in Laminar Flow-Based Membraneless Microfuel Cells", Electrochemical and Solid-State Letters, 8 (7), pp. A348-A352, (2005).

Choban, E.R. et al., "Microfluidic Fuel Cell Based on Laminar Flow", J. Power Sources, 128, pp. 54-60, (2004).

www.whatman.com "Leadership in separations technology for the life Sciences", 1 page, (2009).

Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).

Chan, K-Y et al., "Meniscus behavior and oxygen reduction in tapered pore gas diffusion electrodes", Electrochimica Acta, vol. 33, No. 12, pp. 1767-1773, (1988).

Chan, K-Y et al., "A wedge-meniscus model of Gas-Diffusion Electrodes", Electrochimica Acta, 32, 8, pp. 1227-1232, (1987).

Waszczuk, P. et al., "Methanol Electrooxidation on Platinum/Ruthenium Nanoparticle Catalysts", Journal of Catalysis, 203, pp. 1-6, (2001).

Peng, F.Z. et al., "A new ZVS bidirectional dc-dc converter for fuel cell and battery application," IEEE Transactions on Power Electronics, 19, 1, pp. 54-65, (2004).

Krein, P.T. et al., "Low cost inverter suitable for medium-power fuel cells," IEEE Power Electronics Specialists Conference, vol. 1, pp. 321-326, (2002).

Cygan, P.J. et al., "Hybrid Power Sources for Military Applications," The Eighteenth Annual Battery Conference on Applications and Advances, pp. 85-90, (1), 1998.

Jarvis, L.P. et al., "Hybrid Power Source for Manportable Applications," IEEE Aerospace and Electronic Systems Magazine, 18, 1, pp. 13-16, (2003).

Atwater, T.B. et al., "Man portable power needs of the $21^{st}$ century," Journal of Power Sources, vol. 91, No. 1, pp. 27-36, (2000).

Jarvis, L.P. et al., "Fuel cell/Lithium-ion battery hybrid for manportable applications," The Seventeenth Annual Battery Conference on Applications and Advances, pp. 69-72, (2002).

Gao, L. et al. "An actively controlled fuel cell/battery to meet pulsed power demands," Journal of Power Sources, 130, pp. 202-207, (2004).

Zheng, J.P. et al., "Hybrid power sources for pulsed current applications," IEEE Transactions on Aerospace and Electronic Systems, vol. 37, pp. 288-292, (2001).

Jiang, Z. et al., "Design and experimental tests of control strategies for active hybrid fuel cell/battery power sources," Journal of Power Sources, 130, pp. 163-171 (2004).

Acharya, P. et al., "An advanced fuel cell simulator," IEEE Applied Power Electronics Conference, pp. 1554-1558, (2004).

Weigl, B.H. et al., "Microfluidic diffusion-based separation and detection", Science, 283, pp. 346-347, (1999).

Kenis, P.J.A. et al., "Microfabrication Inside Capillaries Using Multiphase Laminar Flow Patterning", Science, vol. 285, pp. 83-85, (1999).

Wesseler, E.P. et al., "The Solubility of Oxygen in Highly Fluorinated Liquids", Journal of Fluorine Chemistry, 9, pp. 137-146, (1977).

(56) References Cited

OTHER PUBLICATIONS

Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).
International Search Report dated Oct. 25, 2006 for PCT application No. PCT/US05/05962.
Rice, C. et al., "Direct Formic Acid Fuel Cells", Journal of Power Sources, vol. 111, pp. 83-89, (2002).
Lu, G-Q et al., "Formic Acid Decomposition on Polycrystalline Platinum and Palladized Platinum Electrodes", J. Phys. Chem., vol. 103, pp. 9700-9711, (1999).
Waszczuk, P. et al., "A nanoparticle catalyst with superior activity for electrooxidation of formic acid", Electrochemistry Communications, vol. 4, pp. 599-603, (2002).
International Search Report dated Mar. 30, 2007 for PCT application No. PCT/US05/32990.
Park, S. et al., "Electrochemical Infrared Characterization of CO Domains on Ruthenium-Decorated Platinum Nanoparticles" J. Am. Chem. Soc. 125, pp. 2282-2290, (2003).
Babu, P.K. et al., "Electronic Alterations Caused by Ruthenium in Pt-Ru Alloy Nanoparticles as Revealed by Electrochemical NMR", J. Phys. Chem., 107, pp. 7595-7600, (2003).
Hentges, P.J. et al., "Planar tunneling spectroscopic studies of splitting vs. non-splitting of the zero-bias conductance peak in $YBa_2Cu_3O_7$, thin films", Physica C, 408-410, pp. 801-803, (2004).
Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).
Greene, L.H. et al., "Planar tunneling spectroscopy of high-temperature superconductors: Andreev bound states and broken symmetries", Physica C, 387, pp. 162-168, (2003).
Greene, L.H. et al., "Detection and Control of Broken Symmetries with Andreev Bound State Tunneling Spectroscopy: Effects of Atomic-Scale Disorder", Physica C, 408-410, pp. 804-806, (2004).
Kimball, J.W. et al., "Issues with low-input-voltage boost converter design," IEEE Power Electronics Specialists Conference, Aachen, Germany, pp. 2152-2156, (2004).
Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).
Kenis, P.J.A. et al., "Microfabrication Inside Capillaries Using Multiphase Laminar Flow Patterning," Science, vol. 285, pp. 83-85, (1999).
Ismagilov, R.F. et al., "Pressure-driven laminar flow in tangential microchannels: an elastomeric microfluidic switch", Anal. Chem., 73, pp. 4682-4687, (2001).
Dobbs, B.G. et al., "A multiple-input dc-dc converter topology", IEEE Power Electronic Letters, vol. 1, No. 1, pp. 6-9, (2003).
Musunuri, S. et al., "Fabrication and Characterization of PDMA Inductors", IEEE Power Electronics Specialists Conference, Aachen, Germany, pp. 4460-4466, (2004).
Coutanceau, C. et al., "Radioactive Labeling Study and FTIR Measurements of Methanol Adsorption and Oxidation on Fuel Cell Catalysts", Fuel Cells, 2, pp. 153-158, (2002).
Jankowski A.F., et al., "Sputter Deposition of Metallic Sponges", 48th International Symposium on the American Vacuum Society, San Francisco, CA, Oct. 26-Nov. 2, 2001, 14 pages (2001).
Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).
Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).
Zhang, J. et al., "Electrochemical Measurement of $O_2$ Permeation Rate through Polymer Electrolyte Membranes", 216th ECS Meeting, Abstract #830, The Electrochemical Society, 1 page, (2009).
Chu, D. et al., Alkaline Membrane Electrolyte Fuel Cell Research and Development at the U.S. Army Research Laboratory, 216th ECS Meeting, Abstract #385, The Electrochemical Society, 1 page, (2009).
Jiang, R. et al., "Water and Fuel Crossover in a Direct Methanol Fuel Cell Stack", 212th ECS Meeting, Abstract #601, The Electrochemical Society, 1 page, (2007).
Jiang, R. et al., "A Palladium Deposited Nafion Membrane via Supercritical Carbon Dioxide ($sc-CO_2$) Medium for DMFCs", 207th ECS Meeting, Abstract #784, The Electrochemical Society,1 page, (2005).
Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).
Jiang, R. et al., "Direct Methanol Fuel Cell System Performance: From Materials, Components, to System and Fuel Efficiency", 209th ECS Meeting, Abstract #1143, The Electrochemical Society, 1 page, (2006).
Jiang, R. et al., "Durability Evaluation of Direct Methanol Fuel Cells", 208th ECS Meeting, Abstract #1216, The Electrochemical Society, 1 page, (2005).
Jiang, R. et al., "Comparison of Several Research Approaches for Direct Methanol Fuel Cell Membranes", 208th ECS Meeting, Abstract #965, The Electrochemical Society, 1 page, (2005).
Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).
Chen, C.Y. et al., "Portable DMFC system with methanol sensor-less control", Journal of Power Sources, 167, pp. 442-449, (2007).
Livshits, V. et al., "Direct ethylene glycol fuel-cell stack—Study of oxidation intermediate products", Journal of Power Sources, 178, pp. 687-691, (2008)
Cooper, K.R. et al., "Electrical Test Methods for On-Line Fuel Cell Ohmic Resistance Measurement", Journal of Power Sources, vol. 160, pp. 1088-1095, (2006).
Niemann, J., "Unraveling Fuel Cell Electrical Measurements", Fuel Cell Magazine, April/May, pp. 26-31, (2005).
Smith, M. et al., "Comparison of Fuel Cell Electrolyte Resistance Measurement Techniques", Fuel Cell Magazine, April/May, pp. 32-37, (2005).
Hollinger et al., "Nanoporous separator and low fuel concentration to minimize crossover in direct methanol laminar flow fuel cells," Journal of Power of Sources, pp. 3523-3528, (2010).
International Search Report dated Sep. 12, 2007 for PCT Appl. No. PCT/US2007/061980.
Choban et al., "Membraneless laminar flow-based micro fuel cells operating in alkaline, acidic, and acidic/alkaline media," Electrochimica Acta, vol. 50, No. 27, pp. 5390-5398, (2005).
Primak et al., "Improved Performance of Direct Methanol Laminar Flow Fuel Cells," Proceedings 207th ECS Meeting, Abstract #137, Quebec City, Canada, May 15-20, 2005.
International Search Report dated Jun. 24, 2008 for PCT Appl. No. PCT/US2008/059146.

* cited by examiner

LIQUID CONTAINERS AND APPARATUS FOR USE WITH POWER PRODUCING DEVICES

REFERENCE TO RELATED APPLICATIONS

This application claims the benefit of U.S. Provisional Application No. 61/419,743 entitled "LIQUID CONTAINERS AND APPARATUS FOR USE WITH POWER PRODUCING DEVICES" filed Dec. 3, 2010, which is incorporated by reference in its entirety.

BACKGROUND

Fuel cell technology shows great promise as an alternative energy source for numerous applications. Fuel cells have been investigated for use in mobile applications, such as portable computers, mobile communications, and GPS tracking devices. Several types of fuel cells have been developed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled Fuel Cells: Green Power by Sharon Thomas and Marcia Zalbowitz.

An important challenge faced in the development of fuel cell technology is providing a constant supply of liquid fuel to the fuel cell system to ensure its continuous and uninterrupted operation. In attempting to improve liquid fuel delivery, previous liquid fuel cell systems have incorporated fuel delivery systems which include fuel bladders, valves, connectors, and vents designed to manage the flow of liquid fuel and equalize the pressure inside the system with the surrounding environment. However, such components increase the complexity of fuel delivery systems, increasing production costs and making the systems more prone to failure. In addition, increasing system complexity decreases design flexibility, making these systems less adaptable to rugged, mobile applications, such as for use in aggressive military environments, where device simplicity and reliability are essential. Furthermore, systems which incorporate multiple valves and venting mechanisms are more cumbersome, often requiring manual operation and additional user resources.

Fuel delivery system designs also must take into account safety concerns, such as the desire to avoid unnecessary exposure to the liquid fuel, and environmental concerns, such as ensuring that potentially hazardous fuels are not unintentionally discharged into the surrounding environment. Consequently, the requirement that fuel be delivered safely and with an acceptably low risk of spillage complicates fuel delivery designs and may lead to inefficiencies. In summary, the need to provide a constant fuel supply while adhering to acceptable safety standards has resulted in increasingly complex fuel delivery systems which are both expensive to produce and cumbersome to operate.

SUMMARY

In a first aspect, the present invention is a fuel reservoir for dispensing liquid fuel with a dispensing appliance comprising a container having an opening, a liquid fuel in the container, a needle-pierceable septum disposed across the opening of the container, and a locking surface disposed on an exterior surface of the container and configured to engage a locking mechanism of a dispensing appliance.

In a second aspect, the present invention is a fuel reservoir for dispensing liquid fuel with a dispensing appliance comprising a container having an opening, a liquid fuel in the container, a needle-pierceable septum disposed across the opening of the container, and a locking surface disposed on an exterior surface of the container and configured to engage a locking mechanism of a dispensing appliance. The container has one opening. The locking surface is disposed on a side wall of the container. The liquid fuel comprises methanol.

In a third aspect, the present invention is a fuel dispensing system comprising a dispensing appliance for dispensing a liquid fuel from a fuel reservoir and a power-producing system fluidly connected to the dispensing appliance. The dispensing appliance comprises an engagement mechanism having at least two needles, a protecting plate having a raised position and a depressed position, and a locking mechanism. The needles are concealed when the protecting plate is in a raised position and the needles are exposed when the protecting plate is in a depressed position. The protecting plate is in the depressed position and the needles are configured to engage a fuel reservoir when the locking mechanism is in the locked position, and the protecting plate is in the raised position when the locking mechanism is in the unlocked position.

In a fourth aspect, the present invention is a fuel dispensing system comprising a dispensing appliance for dispensing a liquid fuel from a fuel reservoir and a power-producing system fluidly connected to the dispensing appliance. The dispensing appliance comprises an engagement mechanism having at least two needles, a protecting plate having a raised position and a depressed position, and a locking mechanism. The needles are concealed when the protecting plate is in a raised position and the needles are exposed when the protecting plate is in a depressed position. The protecting plate is in the depressed position and the needles are configured to engage a fuel reservoir when the locking mechanism is in the locked position, and the protecting plate is in the raised position when the locking mechanism is in the unlocked position. The power-producing system comprises a fuel cell. The liquid fuel comprises methanol.

In a fifth aspect, the present invention is a fuel dispensing system comprising a fuel reservoir and a dispensing appliance. The fuel reservoir comprises a container having an opening, a liquid fuel in the container, and a needle-pierceable septum disposed across the opening of the container. The dispensing appliance comprises an engagement mechanism having at least two needles, a protecting plate having a raised position and a depressed position, and a locking mechanism. The needles are concealed when the protecting plate is in a raised position and the needles are exposed when the protecting plate is in a depressed position. The protecting plate is in the depressed position and the needles are engaging the fuel reservoir when the locking mechanism is in the locked position, and the protecting plate is in the raised position when the locking mechanism is in the unlocked position. The protecting plate is depressed, and the needles are engaging the fuel reservoir.

In a sixth aspect, the present invention is a method of dispensing fuel to a power-producing system comprising piercing a needle-pierceable septum of a fuel reservoir with a first needle and a second needle, flowing air through the first needle and into the fuel reservoir, and flowing a liquid fuel out of the fuel reservoir, through the second needle, and into a power-producing system.

In a seventh aspect, the present invention is a method of dispensing fuel to a power-producing system comprising piercing a needle-pierceable septum of a fuel reservoir with a first needle and a second needle, flowing air through the first needle and into the fuel reservoir, and flowing a liquid fuel out of the fuel reservoir, through the second needle, and into a power-producing system. The power-producing system comprises a fuel cell. The liquid fuel comprises methanol.

The term "needle-pierceable septum" means an elastomeric or polymeric layer, such as a septum, which is disposed across an opening of a container and is capable of maintaining a liquid tight seal with the contents of the container when a needle is inserted through and pierces the needle-pierceable septum. Preferably, a needle-pierceable septum is capable of maintaining a liquid tight seal with the contents of a container upon removal of the needle from the needle-pierceable septum.

The term "exposed length" means a dimension, such as a length, width, or diameter, along which the needle-pierceable septum is capable of being pierced by a needle.

The term "power producing system" means a device which consumes fuel to produce energy. For example, a power producing system may convert chemical potential energy into electrical energy, or a power producing system may convert chemical potential energy into mechanical energy. One example of a power producing system is an electrochemical cell, which converts chemical potential energy into electrical energy. A power producing system may include a fuel pump which is capable of pumping liquid fuel out of a fuel reservoir.

The term "unreactive" means not reacting. Materials which are unreactive do not oxidize, corrode, or significantly chemically alter each other. For example, a liquid which is unreactive with a container composed of a particular material can be contained within that container for at least one year without significantly corroding or oxidizing the container, and without the container significantly altering the useful chemical properties of the liquid.

DETAILED DESCRIPTION

The present invention makes use of the discovery of liquid fuel reservoir which is capable of simply and efficiently providing a constant supply of liquid fuel to a power producing system. The system employs a needle and septum design which enables the liquid fuel reservoir to be quickly and easily attached to and detached from a dispensing mechanism while maintaining a liquid tight seal and preventing leakage of the liquid fuel contents. The fuel reservoir preferably includes only one opening, making the system suitable for a wide range of applications, from use in low-power consumer electronic devices, to use in more demanding applications. By simplifying the design of the fuel reservoir, its production costs, operational requirements, and likelihood of failure may be reduced.

Figure 1:
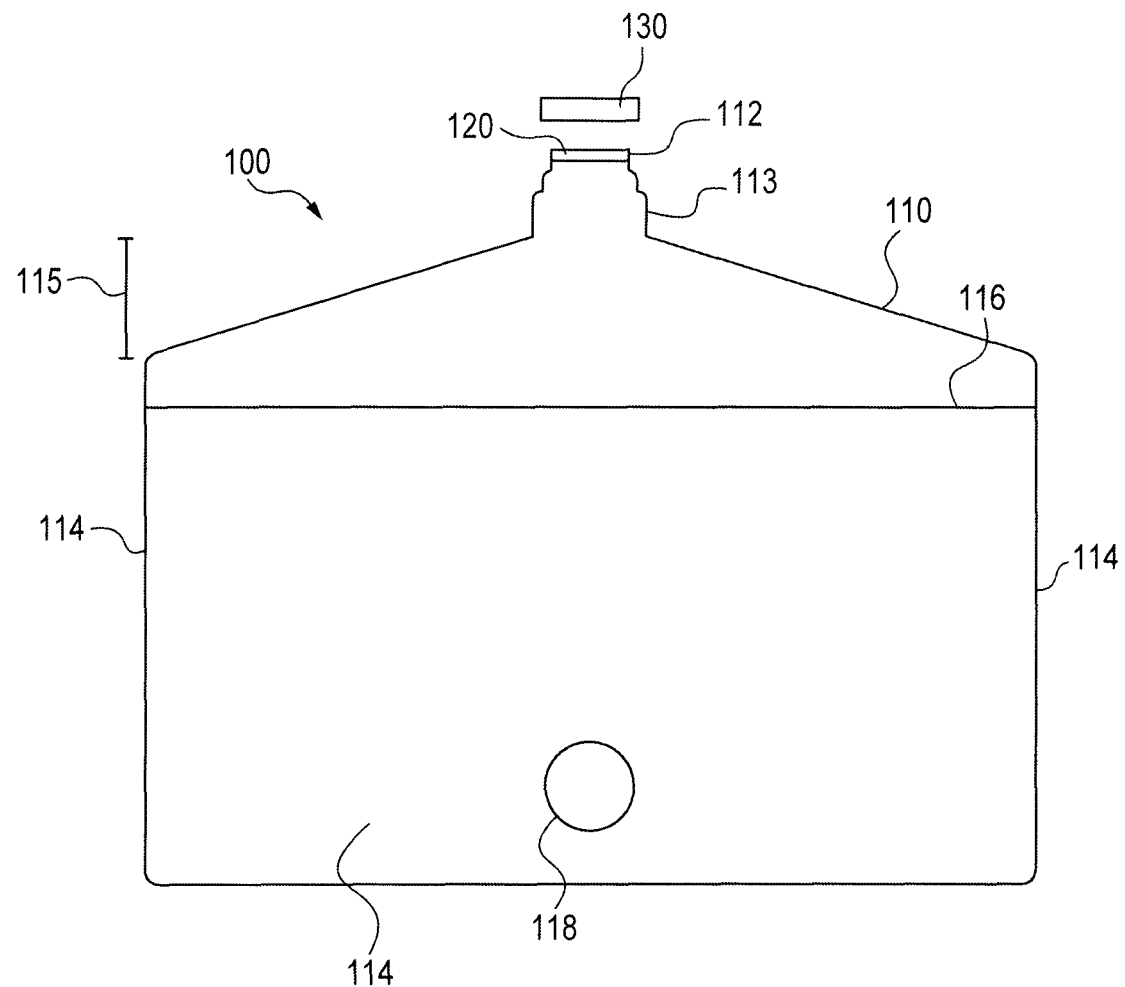
FIG. 1 is an elevation view of a fuel reservoir.

FIG. 1 is an elevation view of a fuel reservoir 100 having aspects of the present invention. The fuel reservoir 100 includes a container 110, a needle-pierceable septum 120, and an optional safety cap 130. The container 110 includes an opening 112, a collar 113, container sidewalls 114, a transition region 115, a liquid fuel 116, and a locking surface 118.

The opening 112 is in fluid communication with the interior volume of the container 110. The collar 113 forms a perimeter around the opening 112 of the container 110 and extends between the opening 112 and the transition region 115. The transition region 115 extends between the collar 113 and the container sidewalls 114. The container sidewalls 114 form a perimeter around the interior volume of the container 110. The liquid fuel 116 is disposed within the container 110. The locking surface 118 is disposed on a container sidewall 114. The needle-pierceable septum 120 is disposed across the opening 112 of the container 110. The optional safety cap 130 may be disposed on the needle-pierceable septum 120 such that the needle-pierceable septum 120 is disposed between the optional safety cap 130 and the interior volume of the container 110.

In operation, the fuel reservoir 100 is filled with liquid fuel 116 by flowing liquid fuel 116 through the opening 112 of the container 110. The needle-pierceable septum 120 is disposed across the opening 112 of the container 110. The optional safety cap 130 may be placed upon the needle-pierceable septum 120 and opening 112 of the container 110. In another aspect, the optional safety cap 130 may be a one-way lockable safety cap which is locked to the opening 112 of the container 110 upon attachment. Preferably, the fuel reservoir 100 does not include a bladder for containing the liquid fuel 116.

The liquid fuel 116 preferably includes an alcohol-based fuel, such as methanol or ethanol. Other fuels include organic hydrocarbons, such as butane, gasoline, or kerosene, and organic acids, such as formic acid. Most preferably, the liquid fuel 116 includes methanol fuel. For example, the liquid fuel may be a mixture which includes methanol and water.

Figure 2:
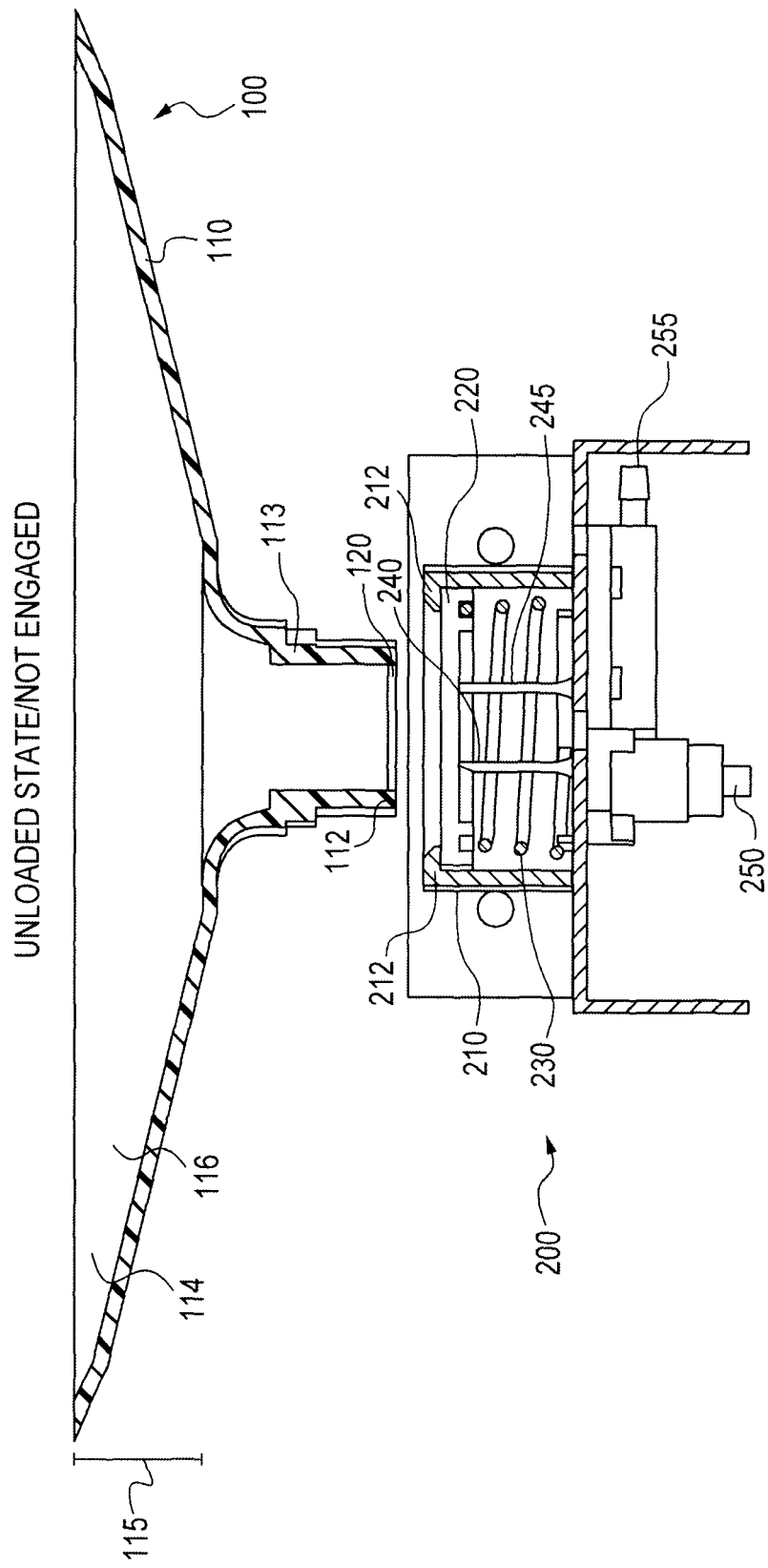
FIG. 2 is a cross-sectional view of a fuel reservoir and dispensing appliance.

FIG. 2 is a cross-sectional view of a fuel reservoir 100 and dispensing appliance 200 having aspects of the present invention. The fuel reservoir 100 includes a container 110 and a needle-pierceable septum 120. The container 110 includes an opening 112, a collar 113, a container sidewall 114, a transition region 115, and a liquid fuel 116. The dispensing appliance 200 includes a collar guide 210, a protecting plate 220, a spring 230, a first needle 240, a second needle 245, an air inlet 250, and a fuel outlet 255. The collar guide 210 includes an inner edge 212.

The inner edge 212 is circumferentially disposed on the upper end of the collar guide 210. The spring 230 is disposed within the collar guide 210. The protecting plate 220 is disposed between the inner edge 212 and the upper end of the spring 230. The first needle 240 and second needle 245 are disposed within the collar guide 210 and extend axially along the spring 230. The first needle 240 is in fluid communication with the air inlet 250. The second needle 245 is in fluid communication with the fuel outlet 255.

Figure 3:
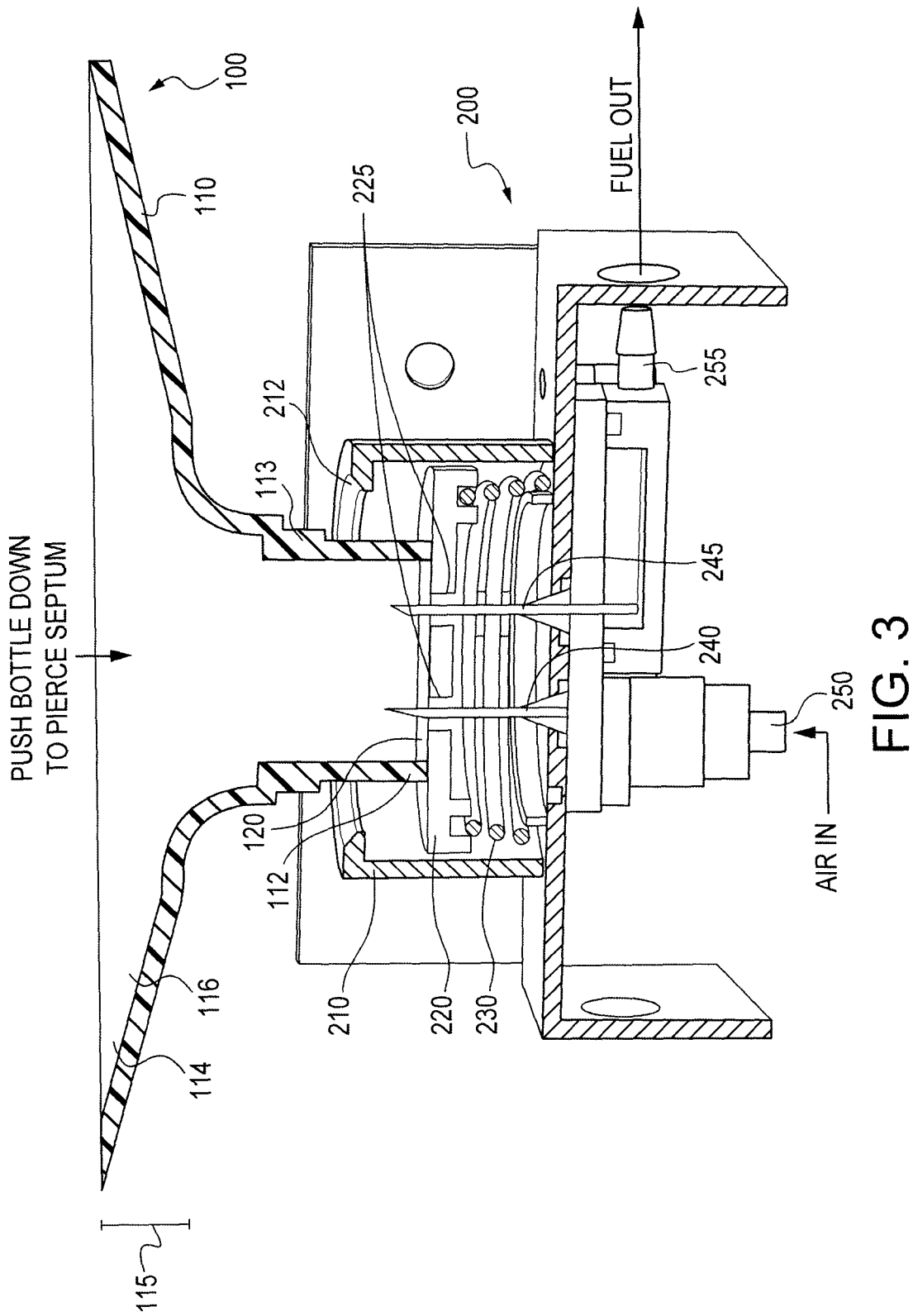
FIG. 3 is a cross-sectional view of a fuel reservoir engaging a dispensing appliance.

FIG. 3 is a cross-sectional view of a fuel reservoir 100 engaging a dispensing appliance 200 having aspects of the present invention. The fuel reservoir 100 includes a container 110 and a needle-pierceable septum 120. The container 110 includes an opening 112, a collar 113, a container sidewall 114, a transition region 115, and a liquid fuel 116. The dispensing appliance 200 includes a collar guide 210, a protecting plate 220, a spring 230, a first needle 240, a second needle 245, an air inlet 250, and a fuel outlet 255. The collar guide 210 includes an inner edge 212. The protecting plate 220 includes needle apertures 225.

The first and second needles 240, 245 extend through the needle apertures 225 of the protecting plate 220 when the protecting plate 220 is depressed away from the inner edge 212 and towards the first and second needles 240, 245.

In operation, the fuel reservoir 100 is positioned above the protecting plate 220 such that the collar 113 of the container 110 aligns with the collar guide 210 of the dispensing appliance 200. The collar 113 is inserted into the collar guide 210 such that the opening 112 of the container 110 and the needle-pierceable septum 120 contact the protecting plate 220. As force is applied to the protecting plate 220, the spring 230 is compressed, and the first and second needles 240, 245 extend through the needle apertures 225, piercing the needle-pierceable septum 120. Thus, the needles 240, 245 and septum 120 design allows for simple engagement and disengagement of the fuel reservoir 100 with the dispensing appliance 200.

Once the first and second needles 240, 245 have engaged the fuel reservoir 100 by piercing the needle-pierceable septum 120, a liquid-tight seal is formed between the first and second needles 240, 245 and the needle-pierceable septum 120. This liquid-tight seal may prevent liquid fuel 116 from exiting the container 110 through a route other than through the first and/or second needles 240, 245. Preferably, the liquid-tight seal is able to withstand the pressure exerted by the column of the liquid fuel 116 contained above the needle-pierceable septum 120. More preferably, the liquid-tight seal is able to withstand the sum of the pressure exerted by the column of the liquid fuel 116 contained above the needle-pierceable septum 120 and the pressure exerted on the sidewalls 114 of the container 110, for example, during compression of or impact to the fuel reservoir 100. By providing a liquid tight seal between the fuel reservoir 100 and the dispensing appliance 200, these components may safely withstand use in highly mobile applications, for example, use in aggressive military environments, without potentially dangerous leakage of the liquid fuel 116.

When dispensing liquid fuel 116, air may flow through the air inlet 250 and into the container 110, and liquid fuel 116 may flow out of the container 110 and through the fuel outlet 255. By allowing air to flow into the container 110 as liquid fuel 116 flows out of the container 110, the air inlet 250 may prevent the pressure inside the container 110 from dropping below the pressure outside of the container 110. A pressure differential between the inside of the container 110 and the outside of the container 110, where the pressure inside the container 110 is lower than the pressure outside of the container 110, may inhibit removal of liquid fuel 116 from the container 110, due to the formation of a low vacuum which acts to hold the liquid fuel 116 inside of the container 110. By allowing air to flow through the air inlet 250 and into the container 110, the pressure inside the container 110 may be equalized with the pressure outside of the container 110, allowing the liquid fuel 116 to be more easily removed from the container 110.

In one aspect, the air inlet 250 includes a one-way valve which, when the first needle 240 has pierced the needle-pierceable septum 120 and is engaging the fuel reservoir 100, allows air to flow into the container 110 and blocks fuel from flowing out of the container 110. Preferably, the one-way valve allows the pressure inside the container 110 to be equalized with the pressure outside of the container 110 without the need to manually open and close the valve. Such a design simplifies use of the fuel reservoir 100 and dispensing appliance 200, conserves user resources, and ensures predictable dispensing and delivery of the liquid fuel 116.

In another aspect, the interior volume of the container 110 may be pressurized by air forced into the container 110 through the air inlet 250. By forcing air into the container 110, and thus pressurizing its contents, the rate at which liquid fuel 116 flows out of the fuel outlet 255 may be controlled. For example, if liquid fuel 116 is to be dispensed through the fuel outlet 255 at a high rate, air may be forced in through the air inlet 250 until an appropriate pressure is achieved in the interior volume of the container 110. If, on the other hand, liquid fuel 116 is to be dispensed through the fuel outlet 255 at a lower rate, air may be forced in through the air inlet 250 until a lower pressure is achieved in the interior volume of the container 110. Pressurizing the interior volume of the container 110 not only allows for control of the rate at which liquid fuel 116 is dispensed, but also increases the predictability of liquid fuel 116 delivery in applications in which the contents of the container 110 may experience sudden movements, accelerations, and/or changes in orientation; if the contents of the container 110 are in motion or experiencing acceleration, irregular and unpredictable dispensing may result unless the interior volume of the container 110 is sufficiently pressurized.

The simplicity of operation of the fuel reservoir 100 and dispensing appliance 200 allow for flexibility in the design of these components and decrease the likelihood of device failure. Preferably, the fuel reservoir 100 has only one opening 112 through which liquid fuel 116 and air may travel and does not include additional valves, vents, or connectors. By avoiding the use of built-in bladders, valves, vents, and connectors, the cost of the fuel reservoir 100 may be decreased. Additionally, because the fuel reservoir 100 preferably has only one opening 112, and because there is no requirement for including additional valves or ports, there are fewer restrictions on the design of the container 110. For example, the container 110 may be sized to accommodate a variety of liquid fuel 116 volumes without significantly increasing its design complexity. Fuel reservoirs 100 used in small mobile devices, such as mobile phones and laptops, may be sized to hold very small liquid fuel 116 volumes, for example, volumes of from 10 milliliters to 100 milliliters, including 25, 50 and 75 milliliters. Fuel reservoirs 100 used in larger applications may be sized to hold large liquid fuel 116 volumes, for example, volumes of from 100 milliliters to 10 liters or, more preferably, volumes of from 500 milliliters to 2 liters, including 750 milliliters, 1 liter and 1.5 liters. Moreover, the simplicity of design enables the container 110 to be shaped to fit the contours of a variety of applications, which may maximize the volume of liquid fuel 116 held by the container 110.

In preferred embodiments, the fuel reservoir 100 is able to withstand long-term exposure to liquid fuels and has the structural integrity to withstand shock and environmental temperature ranges of from −20° C. to +50° C. Preferably, the fuel reservoir 100 is composed of a liquid fuel-compatible material, such as polyethylene, polypropylene, polyethylene terephthalate, or a similar polymeric material. Such materials are lightweight and durable and may be inexpensively produced by known manufacturing techniques. Additionally, although the fuel reservoirs 100, when inexpensively produced from such materials, may be disposable or single-use, the selection of such materials also may enable the fuel reservoirs 100 to be reused and/or recycled.

The first and second needles 240, 245 and the needle-pierceable septum 120 are preferably designed such that the first and second needles 240, 245 pierce the needle-pierceable septum 120 without tearing or removing material from the needle-pierceable septum 120. By not tearing or removing material from the needle-pierceable-septum 120, the puncture holes created in needle-pierceable septum 120 may close once the first and second needles 240, 245 are disengaged from the fuel reservoir 100, allowing the needle-pierceable septum 120 to maintain a liquid tight seal. The retention of a liquid tight seal prevents the liquid fuel 116 from leaking from the fuel reservoir 100 and enables the fuel reservoir 100 to be repeatedly attached to and removed from the dispensing appliance 200 or transferred between multiple dispensing appliances 200.

To enable the needle-pierceable septum 120 to retain a liquid tight seal after removal of the first and second needles 240, 245, the needle-pierceable septum 120 may be composed of an elastomeric material. Preferably, the needle-pierceable septum 120 is composed of a material or materials which are compatible with the liquid fuel 116 contained by the fuel reservoir 100. More preferably, the material is an elastomeric material which is compatible with methanol fuel. In one aspect, the needle-pierceable septum 120 may be composed of silicone. In another aspect, the needle-pierceable septum 120 may be composed of an elastomer layer, such as a silicone layer, and a polymer layer, such as a polytetrafluoroethylene layer. The elastomer layer of the dual-layer design may provide strength and flexibility to the needle-pierceable septum 120, while the polymer layer may prevent the liquid fuel 116 from contacting and degrading the silicone layer.

Material selection for the first and second needles 240, 245 may also be important to ensure that a liquid tight seal is maintained after removal from the needle-pierceable septum 120. The first and second needles 240, 245 may be exposed to corrosive and oxidative materials, such as liquid fuels. If the first and second needles 240, 245 experience physical degradation, such as oxidation, they may be unable to form a liquid tight seal with the needle-pierceable septum 120 upon engagement of the fuel reservoir 100 with the engagement mechanism 200. Furthermore, needles which have experienced physical degradation may be unable to cleanly puncture the needle-pierceable septum 120, preventing the puncture holes from closing and maintaining a liquid tight seal upon disengagement of the fuel reservoir 100 from the engagement mechanism 200. Preferably, the first and second needles 240, 245 are composed of a chemically resistant metal alloy, such as steel or stainless steel. Such metal alloys may resist physical degradation while maintaining a sharp point which is capable of cleanly piercing the needle-pierceable septum 120.

While liquid fuel 116 is being dispensed from the fuel reservoir 100, the liquid fuel 116 flows along the transition region 115 and into the collar 114. The transition region 115 preferably forms an obtuse angle with at least two of the container sidewalls 114, so that, as the fuel reservoir 100 is emptied, liquid fuel 116 continues to flow along the transition region 115 and into the collar 114, and does not pool in the corners of the container 110. In one aspect, the transition region 115 is designed so that no more than 10% of the liquid fuel 116 capacity of the container 110 remains in the container 110 when the container 110 is angled at ±45 degrees from the vertical orientation shown in FIGS. 2 and 3. In another aspect, the transition region 115 is designed so that no more than 5% of the liquid fuel 116 capacity of the container 110 remains in the container 110 when the container 110 is angled ±45 degrees from the vertical orientation shown in FIGS. 2 and 3. Such flexibility in use of the fuel reservoir 100 and dispensing appliance 200 makes these components ideal for applications in which dispensing may occur while the fuel reservoir 100 is in various orientations. Optionally, a fuel pump may be attached to the fuel outlet 255 of the dispensing appliance 200 to dispense liquid fuel 116 from the fuel reservoir 100. For example, a power producing system which includes a fuel pump may attached to the fuel outlet 255 of the dispensing appliance 200 to dispense liquid fuel 116 from the fuel reservoir 100.

Figure 9:
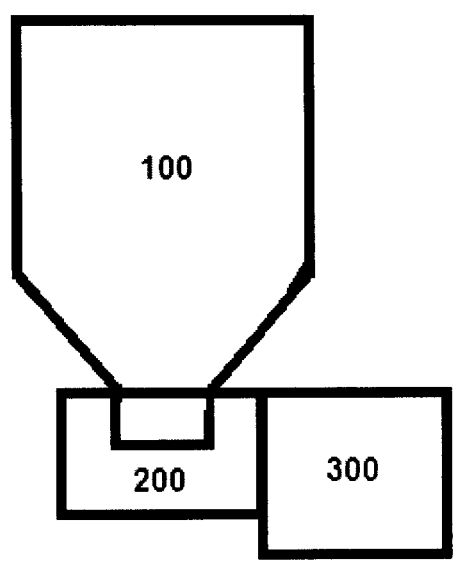
FIG. 9 illustrates a fuel reservoir engaging a dispensing appliance, with a power-producing system in fluid connection with the dispensing appliance.

FIG. 9 is a schematic illustrating a fuel reservoir 100 engaging a dispensing appliance 200, with a power-producing system 300 in fluid connection with the dispensing appliance 200.

Figure 4:
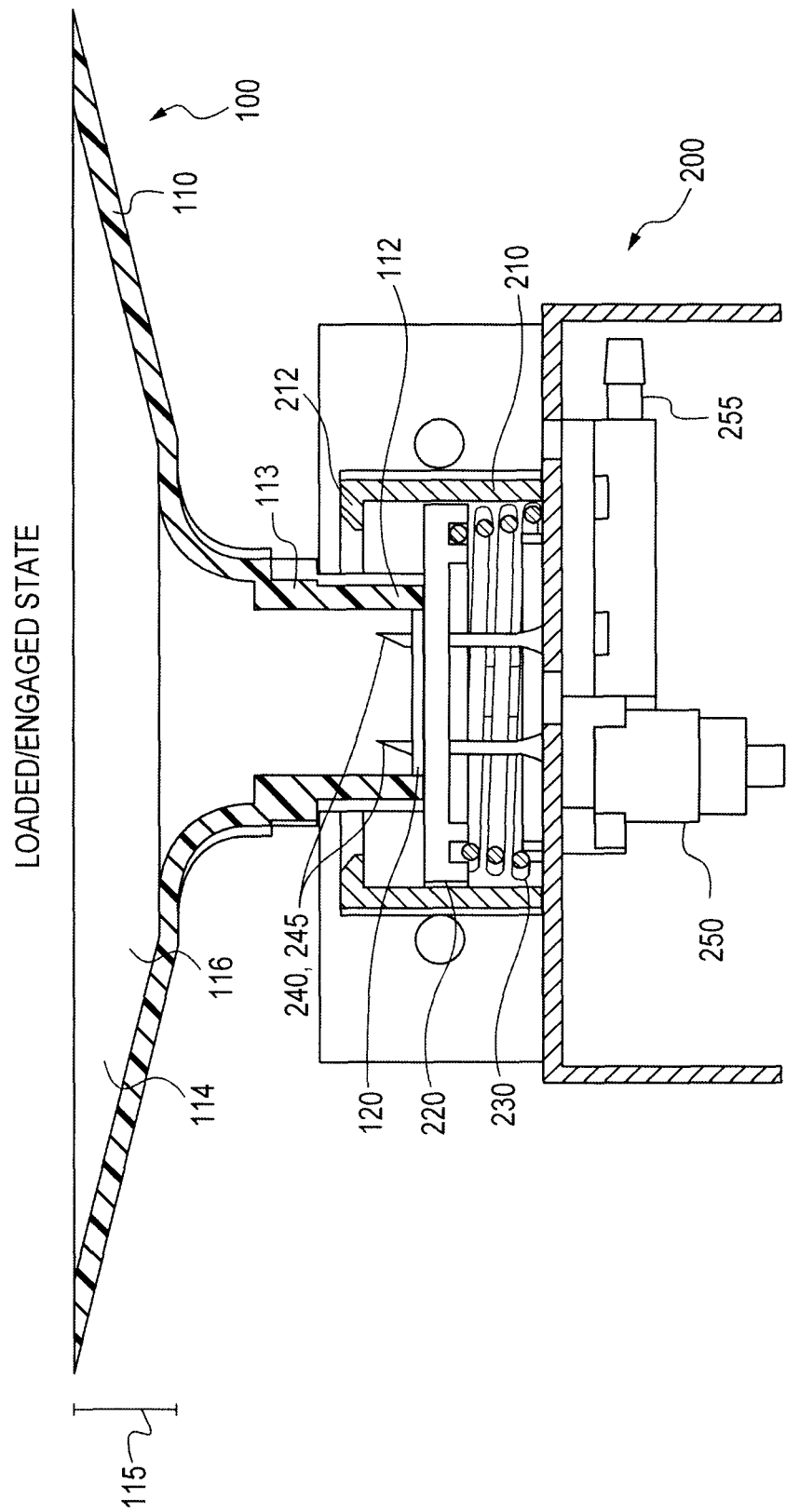
FIG. 4 is a cross-sectional view of a fuel reservoir engaging a dispensing appliance.

FIG. 4 is a cross-sectional view of a fuel reservoir 100 engaging a dispensing appliance 200 having aspects of the present invention. The fuel reservoir 100 includes a container 110 and a needle-pierceable septum 120. The container 110 includes an opening 112, a collar 113, a container sidewall 114, a transition region 115, and a liquid fuel 116. The dispensing appliance 200 includes a collar guide 210, a protecting plate 220, a spring 230, a first needle 240, a second needle 245, an air inlet 250, and a fuel outlet 255. The collar guide 210 includes an inner edge 212.

Figure 5:
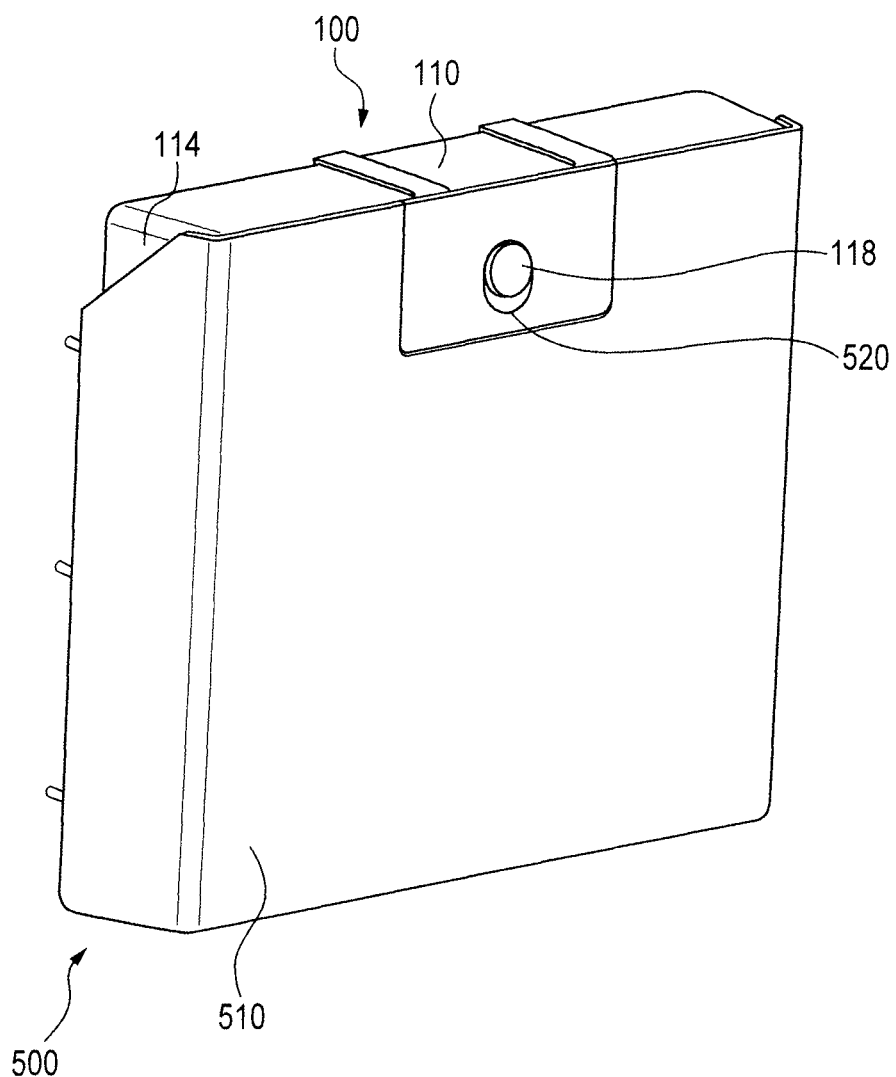
FIG. 5 illustrates a fuel reservoir and container holder.

FIG. 5 illustrates a fuel reservoir 100 and container holder 500 having aspects of the present invention. The fuel reservoir 100 includes a container 110, container sidewalls 114, and a locking surface 118. The container holder 500 includes a holder body 510 and a locking mechanism 520.

The container 110 and container sidewalls 114 are enclosed within the holder body 510. The locking surface 118 is mechanically coupled to the locking mechanism 520.

In operation, the container 110 is slidably inserted into the holder body 510 of the container holder 500. As the container 110 is inserted, the locking surface 118 engages the locking mechanism 520, mechanically coupling the locking surface 118 and the locking mechanism 520. To remove the container 110 from the container holder 500, the locking surface 118 may be disengaged from the locking mechanism 520. In one aspect, the locking surface 118 may be disengaged from the locking mechanism 520 by (1) pressing down on the locking surface 118 in a direction towards the interior volume of the container 110, and (2) sliding the container 110 out of the container holder 500, while the locking surface remains depressed.

In another aspect, the locking mechanism 520 may be a latch, strap, or button snap, and the locking surface 118 may be the surface over which the latch or strap are secured, or the surface to which the button snap is attached. In yet another aspect, the locking mechanism 520 and locking surface 118 may be hook fasteners and loop fasteners. In yet another aspect, the locking mechanism 520 and locking surface 118 may be magnetically coupled to each other.

Figure 6:
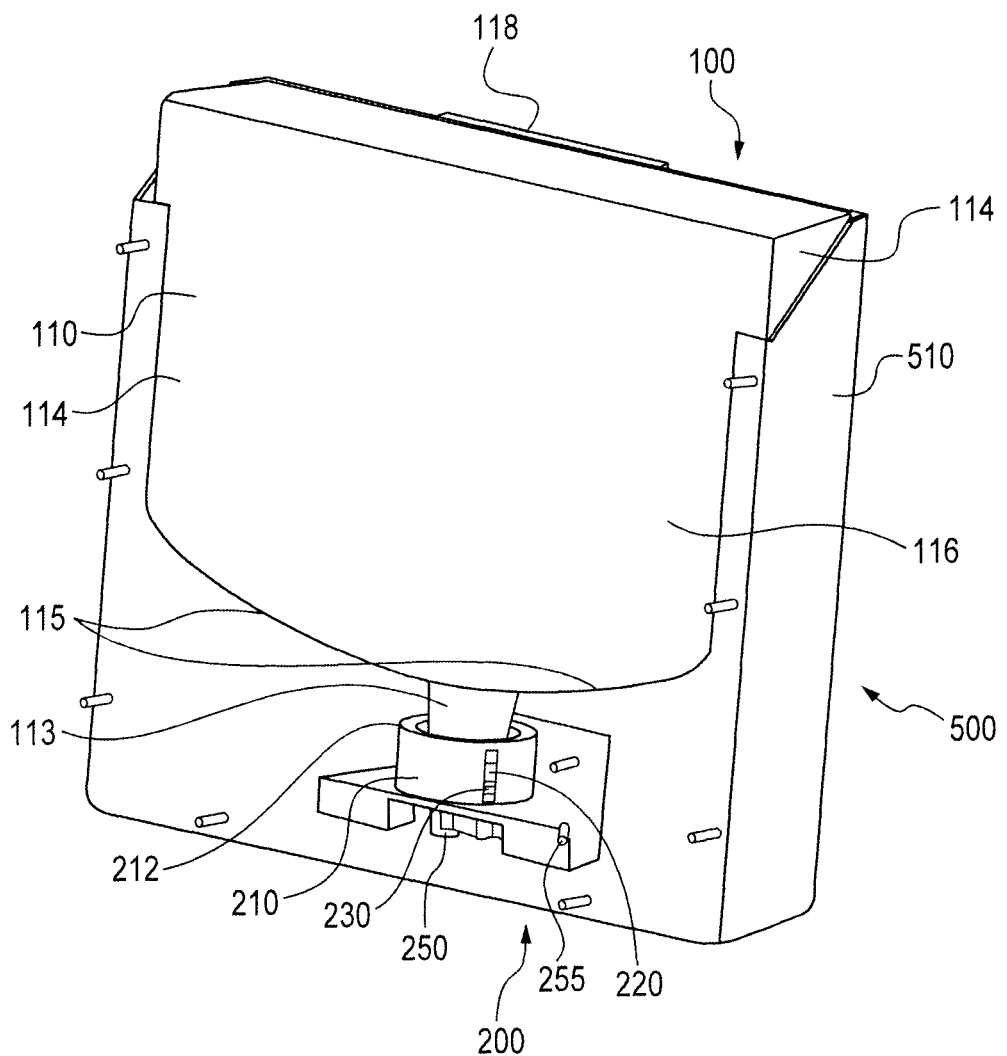
FIG. 6 illustrates a fuel reservoir, dispensing appliance, and container holder.

FIG. 6 illustrates a fuel reservoir 100, dispensing appliance 200, and container holder 500 having aspects of the present invention. The fuel reservoir 100 includes a container 110, a collar 113, container sidewalls 114, a transition region 115, a liquid fuel 116 and a locking surface 118. The dispensing appliance 200 includes a collar guide 210, a protecting plate 220, a spring 230, an air inlet 250, and a fuel outlet 255. The collar guide 210 includes an inner edge 212. The container holder 500 includes a holder body 510 and a locking mechanism 520 (not illustrated in FIG. 6).

The dispensing appliance 200 is disposed within the holder body 510 and is mechanically coupled to an interior surface of the holder body 510.

In operation, the container 110 is slidably inserted into the holder body 510. As the container 110 is inserted into the holder body 510, the collar 113 enters the collar guide 210 and causes the protecting plate 220 to compress the spring 230. As the protecting plate 220 is depressed, the dispensing appliance 200 engages the fuel reservoir 100, for example, by piercing a septum of the fuel reservoir 100 with a needle. In addition, as the protecting plate 220 is depressed, the locking surface 118 of the fuel reservoir 100 engages the locking mechanism 520, mechanically coupling the fuel reservoir 100 in the container holder 500. Once the dispensing appliance 200 has engaged the fuel reservoir 100, liquid fuel 116 may be removed from the container 110 through the fuel outlet 255, and air may travel into the container 110 through the air inlet 250.

To remove the fuel reservoir 100 from the container holder 500, the locking surface 118 of the container 110 is depressed, disengaging the locking surface 118 from the locking mechanism 520. As the fuel reservoir 100 is removed from the container holder 500, the protecting plate 220 is raised and the fuel reservoir 100 is disengaged from the dispensing appliance 200. Preferably, as the fuel reservoir 100 is disengaged from the dispensing appliance 200, the fuel reservoir 100 maintains a liquid tight seal, preventing liquid fuel 116 from leaking out of the container 110 and into the surrounding environment. More preferably, as the fuel reservoir 100 is disengaged from the dispensing appliance 200, the first and second needles 240, 245 are withdrawn from the needle-pierceable septum 120. As the first and second needles 240, 245 are withdrawn, the puncture holes created in needle-pierceable septum 120 close, allowing the needle-pierceable septum 120 to maintain a liquid tight seal with the interior volume of the container 110.

In preferred embodiments, the holder body 510 of the container holder 500 is able to withstand exposure to liquid fuels and has the integrity to withstand shock and environmental temperature ranges of from −20° C. to +50° C. Preferably, the holder body 510 is composed of a lightweight, rigid, and durable material, such as high-density polyethylene, polypropylene, polycarbonate, aluminum, or carbon fiber.

Figure 7:
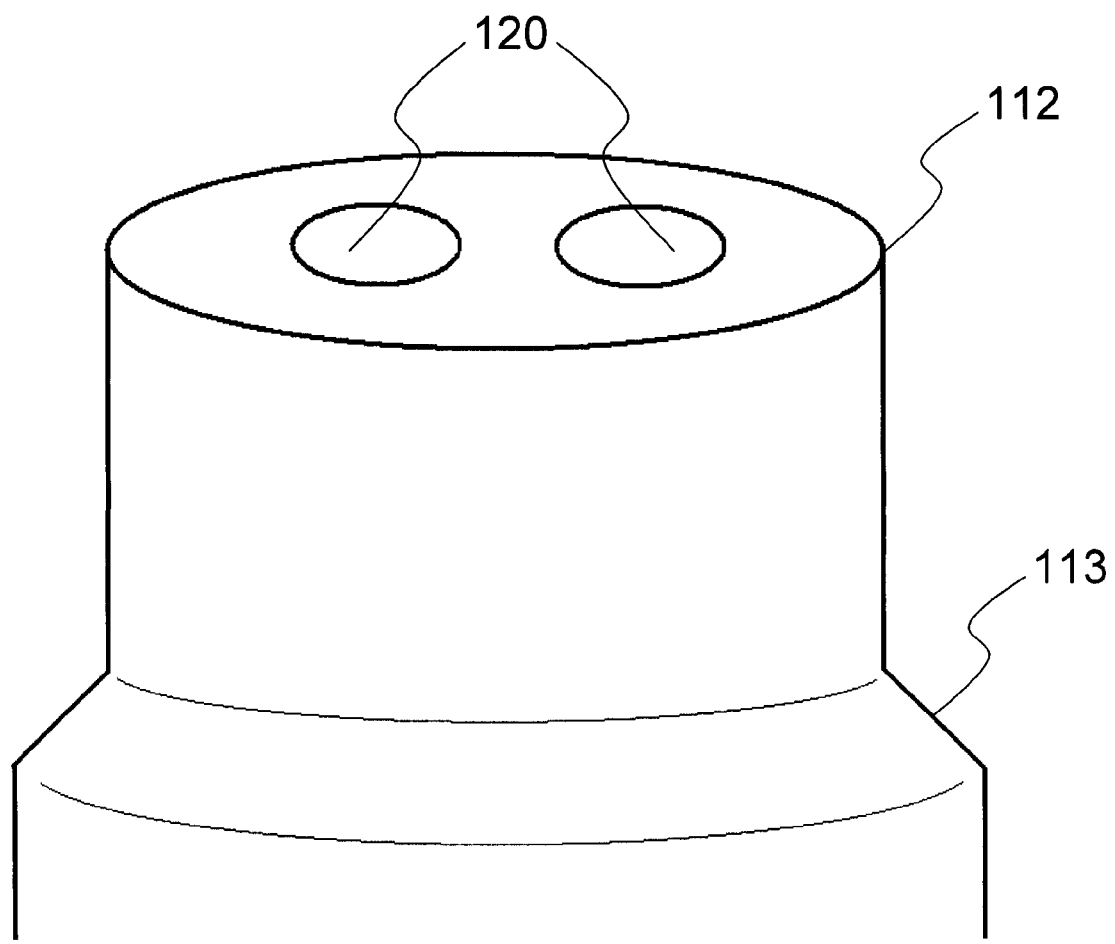
FIG. 7 illustrates a fuel reservoir having a needle-pierceable septum.

FIG. 7 illustrates a fuel reservoir 100 with a needle-pierceable septum 120 having aspects of the present invention. The fuel reservoir 100 includes an opening 112, a collar 113, and a needle-pierceable septum 120. The needle-pierceable septum 120 may be a single, continuous septum, as shown in FIG. 2, or the needle-pierceable septum 120 may be two or more separate septums, as shown in FIG. 7. If the needle-pierceable septum 120 includes two of more separate septums, the first and second needles 240, 245 each may pierce a separate septum. For example, the first needle 240 may pierce and flow air into the fuel reservoir 100 through one septum, while the second needle 245 may pierce and flow liquid fuel 116 out of the fuel reservoir 100 through another septum.

Figure 8:
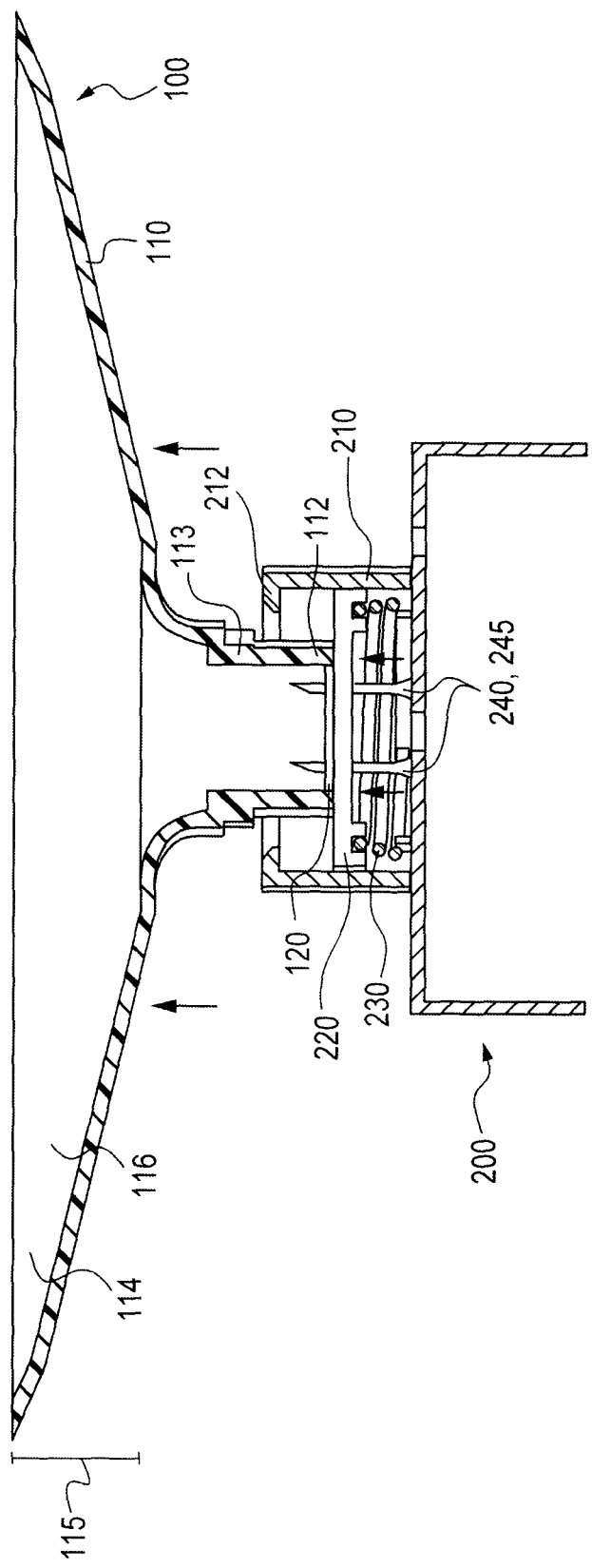
FIG. 8 illustrates the disengagement of a fuel reservoir from a dispensing appliance.

FIG. 8 illustrates the disengagement of a fuel reservoir from a dispensing appliance having aspects of the present invention. The fuel reservoir 100 includes a container 110 and a needle-pierceable septum 120. The container 110 includes an opening 112, a collar 113, a container sidewall 114, a transition region 115, and a liquid fuel 116. The dispensing appliance 200 includes a collar guide 210, a protecting plate 220, a spring 230, a first needle 240, and a second needle 245. The collar guide 210 includes an inner edge 212.

Disengagement and removal of the fuel reservoir 100 from the dispensing appliance 200 is facilitated by the spring 230, which may be in a compressed state beneath the protecting plate 220 before removal of the fuel reservoir 100. Consequently, upon disengagement, the decompression force of the spring 230 may move the protecting plate 220 in the direction of the arrows illustrated in FIG. 8, disengaging the first and second needles 240, 245 from the needle-pierceable septum 120 and ejecting the fuel reservoir 100.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A fuel dispensing system, comprising:
 a fuel reservoir, comprising:
  a container, having an opening;
  a liquid fuel, in the container;
  a needle-pierceable septum, disposed across the opening of the container; and
  a locking surface, disposed on an exterior surface of the container;
 a dispensing appliance, comprising:
  an engagement mechanism, having at least two needles;
  a protecting plate, having a raised position and a depressed position, wherein the needles are concealed when the protecting plate is in a raised position and the needles are exposed when the protecting plate is in a depressed position; and
  a locking mechanism;
  wherein the protecting plate is depressed,
  the needles are engaging the fuel reservoir,
  the locking surface is configured to engage the locking mechanism, and
  the protecting plate is in the depressed position and the needles are engaging the fuel reservoir when the locking mechanism is in the locked position, and the protecting plate is in the raised position when the locking mechanism is in the unlocked position.

2. The fuel dispensing system of claim 1, further comprising a power-producing system in fluid connection with the dispensing appliance.

3. The fuel dispensing system of claim 2, wherein the container has one opening.

4. The fuel dispensing system of claim 2, wherein the locking surface is disposed on a side wall of the container.

5. The fuel dispensing system of claim 2, wherein the needle-pierceable septum comprises silicone.

6. The fuel dispensing system of claim 2, wherein the septum has an exposed length of 1 mm to 20 mm.

7. The fuel dispensing system of claim 2, wherein the power-producing system comprises a fuel cell.

8. The fuel dispensing system of claim 2, wherein the liquid fuel comprises an alcohol.

9. The fuel dispensing system of claim 2, wherein the liquid fuel comprises methanol.

10. The fuel dispensing system of claim 2, wherein the liquid fuel comprises a hydrocarbon fuel.

11. The fuel dispensing system of claim 10, wherein the hydrocarbon fuel comprises gasoline.

12. The fuel dispensing system of claim 2, wherein the needles comprise:
 a first needle, having a valve; and
 a second needle;
 wherein the valve blocks liquid fuel from flowing out of the fuel reservoir through the first needle when the first needle is engaging the fuel reservoir,
 the valve allows air to pass into the fuel reservoir when the first needle is engaging the fuel reservoir, and
 the second needle is fluidly connected to the fuel reservoir when the second needle is engaging the fuel reservoir.

13. The fuel dispensing system of claim 12, wherein the first needle is configured to equalize the air pressure inside of the fuel reservoir and the air pressure outside of the fuel reservoir when the first needle is engaging the fuel reservoir.

14. The fuel dispensing system of claim 2, wherein the septum has an exposed length of less than 50 mm.

\* \* \* \* \*

UNITED STATES PATENT AND TRADEMARK OFFICE
CERTIFICATE OF CORRECTION

PATENT NO. : 8,783,304 B2
APPLICATION NO. : 13/298084
DATED : July 22, 2014
INVENTOR(S) : Larry J. Markoski et al.

It is certified that error appears in the above-identified patent and that said Letters Patent is hereby corrected as shown below:

Title Page

References Cited Other Publications Item (56)

Page 3.

Col. 1, Line 10, please delete "hydropenandfuelcells" and insert --hydrogenandfuelcells--
Col. 1, Line 11, please delete "gems" and insert --pems--
Col. 2, Line 4, please delete "Halliday." and insert --Halliday--

Page 4.

Col. 1, Line 26, please delete "YBa$_2$Cu$_3$O$_7$." and insert --YBa$_2$Cu$_3$O$_7$.--
Col. 2, Line 53, please delete "of Power of Sources," and insert --of Power Sources,--

Signed and Sealed this
Twenty-fifth Day of August, 2015

Michelle K. Lee
*Director of the United States Patent and Trademark Office*